(12) United States Patent
Maillard et al.

(10) Patent No.: US 7,684,567 B2
(45) Date of Patent: Mar. 23, 2010

(54) SMARTCARD DYNAMIC MANAGEMENT

(75) Inventors: Michel Maillard, Rambouillet (FR); Dominique Le Floch, Montrouge (FR)

(73) Assignees: Nagra Thomson Licensing, Boulogne-Billancourt (FR); Michel A. Maillard, Rambouillet (FR)

( * ) Notice: Subject to any disclaimer, the term of this patent is extended or adjusted under 35 U.S.C. 154(b) by 463 days.

(21) Appl. No.: 10/591,142

(22) PCT Filed: Feb. 18, 2005
(Under 37 CFR 1.47)

(86) PCT No.: PCT/EP2005/050720

§ 371 (c)(1),
(2), (4) Date: Jun. 25, 2007

(87) PCT Pub. No.: WO2005/091633

PCT Pub. Date: Sep. 29, 2005

(65) Prior Publication Data

US 2008/0298585 A1 Dec. 4, 2008

(30) Foreign Application Priority Data

Mar. 11, 2004 (EP) .................................. 04290656

(51) Int. Cl.
*H04N 7/167* (2006.01)
*G06F 15/16* (2006.01)

(52) U.S. Cl. .............. 380/227; 380/204; 380/210; 380/217; 380/239; 382/232; 455/411; 455/500; 709/247

(58) Field of Classification Search ............ None
See application file for complete search history.

(56) References Cited

U.S. PATENT DOCUMENTS

| 7,245,720 | B2 * | 7/2007 | Wajs | 380/210 |
| 7,472,337 | B2 * | 12/2008 | Fox et al. | 714/799 |
| 2004/0215691 | A1 * | 10/2004 | Maria Van De Ven et al. | 709/200 |
| 2005/0025312 | A1 * | 2/2005 | Rijkaert et al. | 380/37 |

FOREIGN PATENT DOCUMENTS

| EP | 0 658 054 A2 | 6/1995 |
| EP | 0 866 613 A1 | 9/1998 |

OTHER PUBLICATIONS

"McCormac Hack over Cablemodem" as published in Online! Aug. 10, 1998, XP002292343 Retrieved from the Internet at URL: http://www.hackwatch.com/cablemodhack.html> Retrieved on Aug. 12, 2004 (see first introductory paragraph) (5 pages).

* cited by examiner

*Primary Examiner*—Kaveh Abrishamkar
(74) *Attorney, Agent, or Firm*—Osha • Liang LLP

(57) ABSTRACT

A method for securing a portable security module for use with a decoding element, the portable security module and the decoding element allowing to descramble scrambled audio-visual information. The method comprises analyzing at the portable security module a sequence of command messages, the command messages of the sequence being received at the portable security module at distinct times.

20 Claims, 8 Drawing Sheets

US 7,684,567 B2

SMARTCARD DYNAMIC MANAGEMENT

BACKGROUND OF INVENTION

1. Field of the Invention

The invention relates generally to portable security modules adapted to descramble scrambled audiovisual information.

2. Background Art

Transmission of encrypted data is well-known in the field of pay TV systems, where scrambled audiovisual information is usually broadcast by terrestrial emitters, satellite or through a cable network to a number of subscribers, each subscriber possessing a decoder or receiver/decoder capable of descrambling the scrambled audiovisual information for subsequent viewing.

In a typical system, the scrambled audiovisual information may be descrambled using a control word. In order to try to improve the security of the system, the control word, is usually changed every ten seconds or so. Every 10 seconds, each subscriber receives, in an ECM (Entitlement Control Message), the control word necessary to descramble the scrambled audiovisual information so as to permit viewing of the transmission.

The control word itself is encrypted by an exploitation key and transmitted in encrypted form in the ECM. The scrambled audiovisual information and the encrypted control word are received by a decoder, which in the case of a paid-up subscriber, has access to the exploitation key stored on a portable security module, e.g., a smart card, inserted in the decoder. The encrypted control word is decrypted using the exploitation key by the smartcard. The smartcard transmits the control word to the decoder. The scrambled audiovisual information is descrambled using the decrypted control word by the decoder. The decoder is indeed powerful enough to provide a real-time descrambling of the scrambled audiovisual information.

The exploitation key is itself periodically changed, e.g. every month or so. An EMM (Entitlement Management Message) is monthly received by the decoder and is transmitted in the smartcard. The EMM contains the exploitation key in an encoded form. A group key assigned to the smartcard enables to decode the encoded exploitation key.

The decoder hence regularly sends command messages to the smartcard.

The command message may be an ECM, i.e. the decoder transmits to the smartcard a control word in an encrypted form. The smartcard decrypts the control word using the exploitation key. The transmitting of the control word typically occurs every 10 seconds.

If a viewer person zaps from a first channel to a second channel, the decoder transmits to the smartcard a second control word in an encrypted form after a transmitting of a first control word in an encrypted form. The first control word and the second control word respectively correspond to the first channel and to the second channel. The smartcard may hence receive Entitlement Control Messages more frequently than every 10 seconds due to the zapping of channels.

The command message may also be an EMM, i.e. the decoder transmits to the smartcard an exploitation key in an encoded form, or any other command message from the decoder.

FIG. 1 schematically illustrates a smartcard according to prior art. The smartcard 11 is activated by a receiving of a message, e.g. an Entitlement Control Message $ECM_n$ from a decoder (not represented): the decoder acts as a master and the smartcard 11 as a slave. A processing unit 12 of the smartcard only executes the command messages received from the decoder. The smartcard 11 comprises a parameters memory, e.g. an EEPROM 13, into which parameters are stored. The processing unit 12 may check that the parameters stored into the EEPROM 13 are correct. The parameters may be for example a size of the Entitlement Control Messages to be received. The processing unit may check that the received Entitlement Control Message $ECM_n$ has a proper size before decrypting an encrypted control word contained in the received Entitlement Control Message $ECM_n$.

A smartcard is generally intended to communicate with a single decoder. However, a fraudulous user may attempt to set up a server between a single smartcard and a plurality of decoders. The server may be a splitter that communicates with the plurality of decoders directly, e.g. via an electrical wire. The server may also be a Control Word server that communicates with the plurality of decoders via a network, e.g. an Internet network.

FIG. 2 schematically illustrates an example of a splitter configuration according to prior art.

A first decoder 24A continuously receives a first scrambled audiovisual information $E_{CW1}(m_1)$ corresponding to a first channel. A second decoder 24B continuously receives a second scrambled audiovisual information $E_{CW2}(m_2)$ corresponding to a second channel. The first decoder 24A and the second decoder 24B respectively allow to provide a real-time descrambling of the first scrambled audiovisual information $E_{CW1}(m_1)$ and of the second scrambled audiovisual information $E_{CW2}(m_2)$.

The first scrambled audiovisual information $E_{CW1}(m_1)$ and the second scrambled audiovisual information $E_{CW2}(m_2)$ are respectively descrambled using a first control word CW1 stored in a first memory 25A of the first decoder 24A and a second control word CW2 stored in a second memory 25B of the second decoder 24B.

At each cryptoperiod, i.e. every 10 seconds for example, the first decoder 24A and the second decoder 24B respectively receive a first Entitlement Control Message ECM1 and a second Entitlement Control Message ECM2.

In a splitter configuration, the first decoder 24A and the second decoder 24B respectively transmit the first Entitlement Control Message ECM1 and the second Entitlement Control Message ECM2 to a single server e.g. a splitter 22 during a single cryptoperiod.

The splitter 22 forwards one of the transmitted Entitlement Control Messages, e.g. ECM1, to a single portable security module, e.g. a smartcard 21. Using an exploitation key stored into a smartcard memory 26, the smartcard decrypts the corresponding control word, e.g. CW1, upon receiving of the forwarded Entitlement Control Message (ECM1). The corresponding control word CW1 is transmitted to the splitter 22. Once the splitter 22 receives the transmitted control word CW1, the splitter 22 forwards a distinct entitlement control message among the transmitted Entitlement Control Messages, e.g. ECM2, to the smartcard 21. The smartcard decrypts the corresponding control word, e.g. CW2, upon receiving of the forwarded Entitlement Control Message (ECM2). The corresponding control word CW2 is transmitted to the splitter 22.

The splitter 22 forwards the decrypted control words CW1 and CW2 respectively to the first decoder 24A and to the second decoder 24B.

The server allows a plurality of decoders to descramble scrambled audiovisual information with a single smartcard.

Summarizing, a paid-up subscriber generally possesses a single portable security module, e.g. a smartcard. However, a server as described for the setup of the fraudulous user, e.g. a splitter or a Control Word server, allows a plurality of decoders to descramble scrambled audiovisual information with a single smartcard. It is hence possible for the paid-up subscriber to provide an access to audiovisual information dedicated to the paid-up subscriber to one or more unauthorized users that do not possess any smartcard.

There is a need for a method allowing to discourage a use of a server in a splitter configuration. However, a regular paid-up subscriber possessing a decoder that communicates directly with a smartcard should not encounter problems.

A first method may consist in implementing a slowing software into smartcards, wherein the slowing software allows to slow down a processing of each smartcard. The smartcards may hence not be able to decrypt more than one control word during a cryptoperiod, e.g. 10 seconds.

A second method may consist in emitting Entitlement Control Messages at shorter cryptoperiods, e.g. every 3 seconds.

Both the first method and the second method allow to restrict processing to a single ECM per cryptoperiod. As a consequence the server will generally fail to synchronize communications between a plurality of decoders and a single smartcard. Only a single decoder may function correctly with the single smartcard.

However, if a regular paid-up subscriber possessing a single decoder zaps from one channel to an other channel at a relatively high zapping rate, the smartcard may also fail to decrypt a plurality of received ECM per cryptoperiod. The regular paid-up subscriber may hence be prevented from zapping between various offered audiovisual information. Typically, a screen of the regular paid-up subscriber may turn blank at a zapping action even if the subscriber is a regular paid-up subscriber.

SUMMARY OF INVENTION

In a first aspect, the invention provides a method for securing a portable security module for use with a decoding element, the portable security module and the decoding element allowing to descramble scrambled audiovisual information. The method comprises processing at the portable security module Entitlement Control Messages (ECMs) received at the portable security module to allow the descrambling of the scrambled audiovisual information. The method further comprises analyzing at the portable security module a sequence of ECMs, the sequence of ECMs comprising a new ECM and a previous ECM received at a previous time, the ECMs of the sequence being received at the portable security module at distinct times, the analyzing being performed at the receiving of the new ECM. An error register is incremented at the analyzing upon a determined result of the analyzing and a penalty applied to the portable security module depending on a value of the error register by introducing a dead time at the processing so as to slow down the processing.

In a first preferred embodiment, the ECMs are replaced with Entitlement Management Messages (EMMs).

In a second preferred embodiment, the dead time has a duration that depends on a value of the error register.

In a third preferred embodiment, the duration of the dead time is shorter than a maximum time value. The maximum time value is high enough to prevent the portable security module from processing more than one Entitlement Control Message during a single cryptoperiod.

In a fourth preferred embodiment, each Entitlement Control Message comprises a channel identifier. The channel identifier is associated to a determined channel. The analyzing of the sequence of ECMs comprises comparing the channel identifier of the new ECM and the channel identifier of the previous ECM.

In a fifth preferred embodiment, each Entitlement Control Message comprises a first encrypted Control Word and a second encrypted Control Word. The first Control Word allows to descramble the scrambled audiovisual information during a first cryptoperiod and the second Control Word allows to descramble the scrambled audiovisual information during a second cryptoperiod distinct from the first cryptoperiod. The analyzing of the sequence of ECMs comprises comparing a second Control Word of the previous ECM to a first Control Word of the new ECM.

In a sixth preferred embodiment, the analyzing of the sequence of ECMs comprises comparing a determined content of a first ECM of the sequence of ECMs to a second determined content of a second ECM of the sequence of ECMs.

In a seventh preferred embodiment, a reset dead time is introduced upon a reset at each processing of the Entitlement Control Messages. The reset dead time has a duration that depends on a number of Entitlement Control Messages received at the portable security module after the reset. The duration is equal to a first reset time value at a first processing immediately following the reset. The first reset time value is smaller than the maximum time value.

In an eighth preferred embodiment, the nature of a further reset is evaluated according to an intermediate group of intermediate command messages. The intermediate group comprises the command messages received after a previous reset preceding the further reset.

In a ninth preferred embodiment, the number of the intermediate ECMs is counted. The number of the intermediate ECMs is compared to a reset threshold number. A result of the comparing allows to evaluate the nature of the further reset. A reset error register is incremented upon the further reset if the further reset is evaluated as suspicious. The portable security module is blocked if the reset error register has a value that is higher than a reset errors threshold.

Preferably, the portable security module is a smartcard and the decoding element is a decoder.

In a second aspect the invention provides a portable security module for use with a decoding element, wherein the portable security module and the decoding element allow to descramble scrambled audiovisual information. The portable security module comprises receiving means to receive Entitlement Control Messages (ECMs) and processing means to process an ECM received at the portable security module so as to allow the descrambling of the scrambled audiovisual information. The portable security module further comprises a command message memory into which a previous ECM received at a previous time may be stored, and analyzing means to analyze a sequence of ECMs, the sequence of ECMs comprising a new ECM and the previous ECM, the ECMs of the sequence being received at the portable security module at distinct times, and the analyzing being performed at each receiving of a new ECM. The portable security module further comprises comparing means to compare the new ECM and the previous ECM of the sequence of ECMs, an error register, incrementing means to increment the error register depending on a result of the comparing, and delaying means to introduce a dead time at each processing so as to slow down the processing.

In a tenth preferred embodiment, the delaying means also allow upon a reset to introduce a reset dead time at each processing following the reset. The reset dead time has a duration that depends on a number of processing following the reset. The duration is equal to a first reset time value at a first processing immediately following the reset.

In an eleventh preferred embodiment, the portable security module further comprises a count register allowing to store a number of intermediate ECMs. The intermediate ECMs are received at the portable security module after a previous reset. The portable security module further comprises a flag. The flag has a value that depends on a result of a comparing of the count register to a reset threshold number. A reset error register is incremented depending on the value of the flag upon a further reset. Blocking means allow to block the portable security module according to a value of the reset error register.

In a twelfth preferred embodiment, the ECMs are replaced by Entitlement Management Messages (EMMs).

In a third aspect, the invention provides a software for use within a portable security module. The software allows to implement the method of the first aspect of the present invention.

In a fourth aspect, the invention provides a method for securing a portable security module. The method comprises downloading a software according to the third aspect of the present invention at manufacturing.

In a fifth aspect, the invention provides a method for securing a portable security module. The method comprises downloading a software according to the third aspect of the present invention. The downloading comprises receiving at the portable security module at least one configuration message from the decoding element.

Other aspects and advantages of the invention will be apparent from the following description and the appended claims.

DETAILED DESCRIPTION

Overview of the Invention

Figure 1:
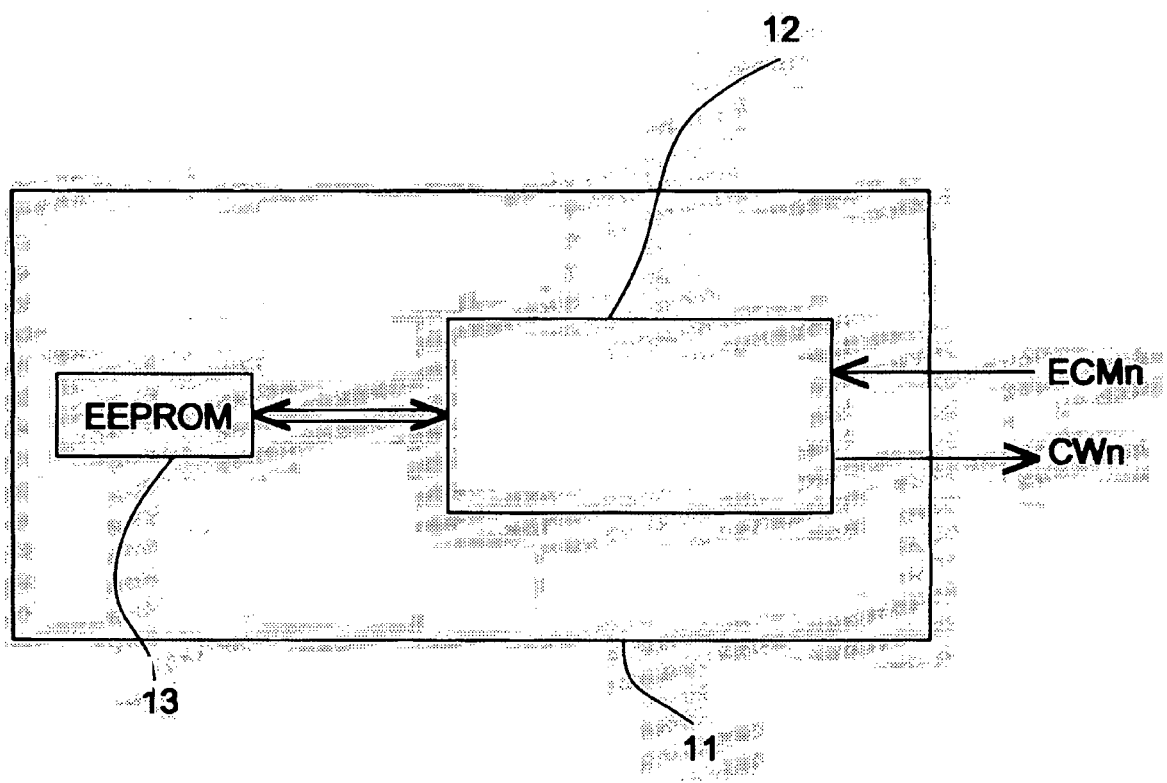
FIG. 1 schematically illustrates an example of a smartcard according to prior art.
Figure 2:
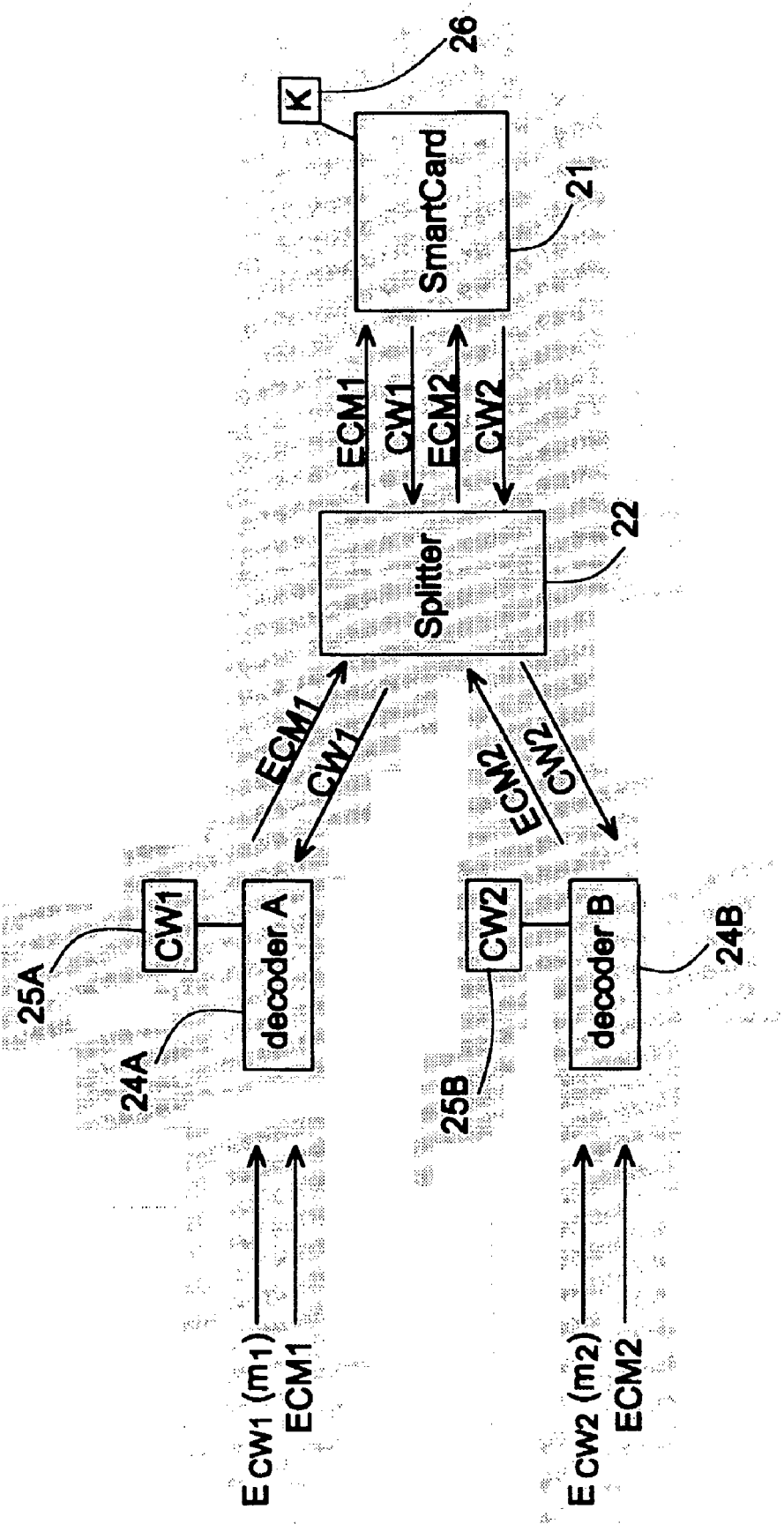
FIG. 2 schematically illustrates an example of a splitter configuration according to prior art.
Figure 3:
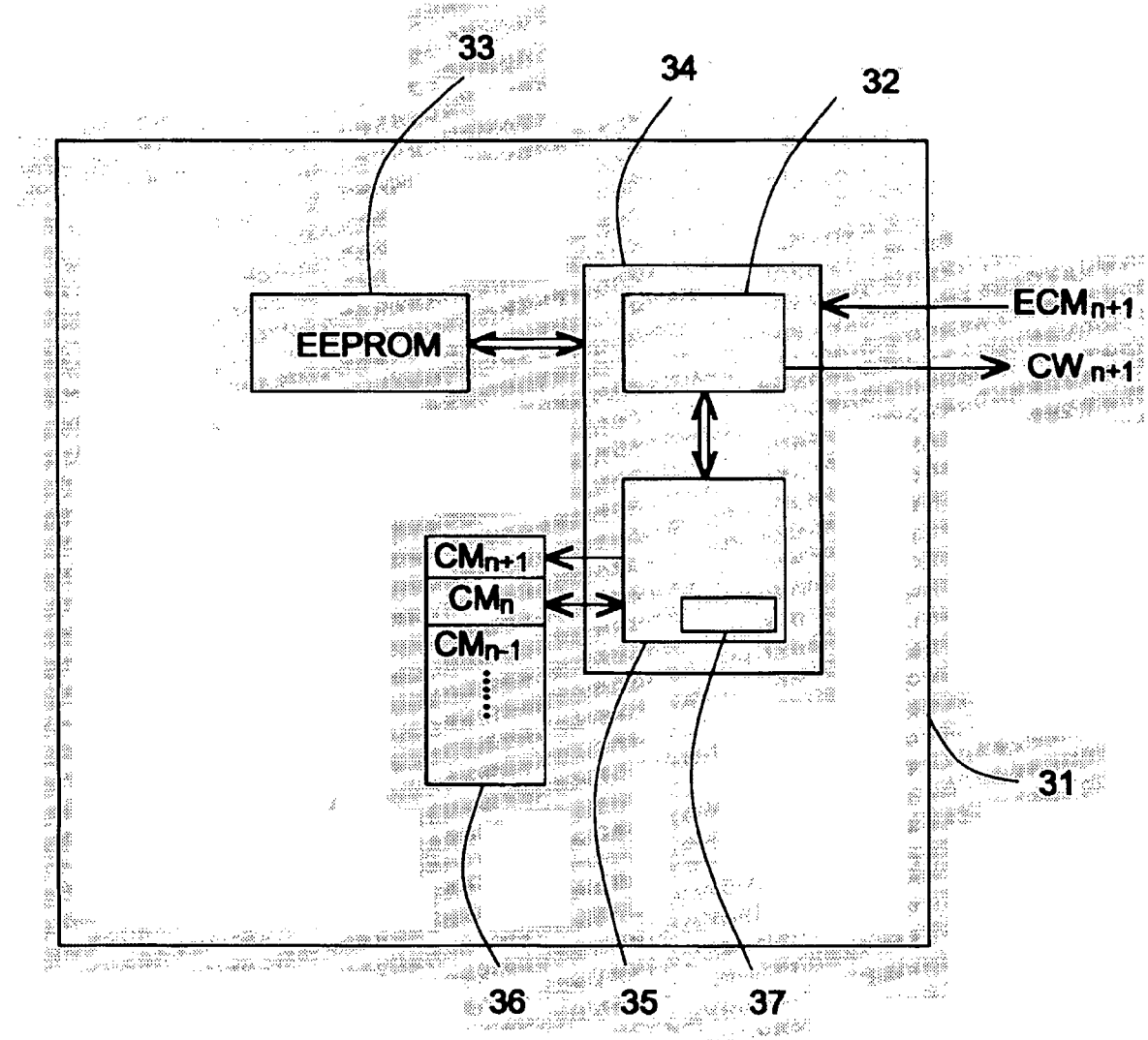
FIG. 3 illustrates an example of a portable security module according to the present invention.

FIG. 3 illustrates an example of a portable security module according to the present invention. A portable security module 31, e.g. a smartcard, is intended to be used with a decoding element (not represented), e.g. a decoder. The portable security module and the decoding element allow to descramble scrambled audiovisual information. The portable security module 31 receives a plurality of messages, e.g. Entitlement Control Messages. The portable security module allows to process each received Entitlement Control Message $ECM_{n+1}$ so as to extract a Control Word $CW_{n+1}$ to be sent to the decoder.

Similar to the portable security module from prior art, the smartcard 31 according to the present invention may comprise a processing unit 32 that only processes the Entitlement Control Messages or other messages received at the portable security module. The portable security module 31 may comprise a parameters memory, e.g. an EEPROM 33, into which parameters are stored. The processing unit 32 may check that the parameters stored into the EEPROM 33 are correct.

The portable security module 31 of the present invention comprises analyzing means 35 to analyze a sequence of command messages ($CM_{n+1}$, $CM_n$). The command messages of the sequence ($CM_{n+1}$, $CM_n$) are received at the portable security module 31 at distinct times.

Typically, the analyzing is performed each time that a new command message $CM_{n+1}$ is received. The sequence of command messages comprises the new command message $CM_{n+1}$ and a previous command message $CM_n$ that may for example be received immediately before the new command message $CM_{n+1}$. The sequence of command messages may further comprise at least one further command message.

The analyzing may comprise comparing a determined content of the command messages of the sequence of command messages ($CM_{n+1}$, $CM_n$). An error register 37 may be incremented upon a determined result of the comparing.

The smartcard of the present invention hence allows to extract information, e.g. a value of the error register 37, the extracted information being relative to command messages that are received before the new command message $CM_{n+1}$. A penalty may be applied to the smartcard 31 depending on a value of the error register 37. Such a method according to the present invention allows, unlike the first method and the second method, to avoid to harm a regular paid-up subscriber possessing a single decoder that zaps from a channel to an other at a relatively high zapping rate.

The smartcard 31 may further comprise a command message memory 36 into which at least one command message among the sequentially received messages may be stored. The command message memory 36 may be distinct from a central processing unit 34 that comprises the processing unit 32 and the analyzing means 35.

Alternatively, the command message memory may be for example a part of the analyzing means: typically, the command message memory may be a single register of the analyzing means or of any other processing means.

The analyzing means 35 may be an hardware device distinct from the processing unit 32, as represented on FIG. 3. Preferably, the analyzing means are an analyzing software that is implemented into the smartcard. The central processing unit comprises a processing software and an analyzing software.

Figure 4:
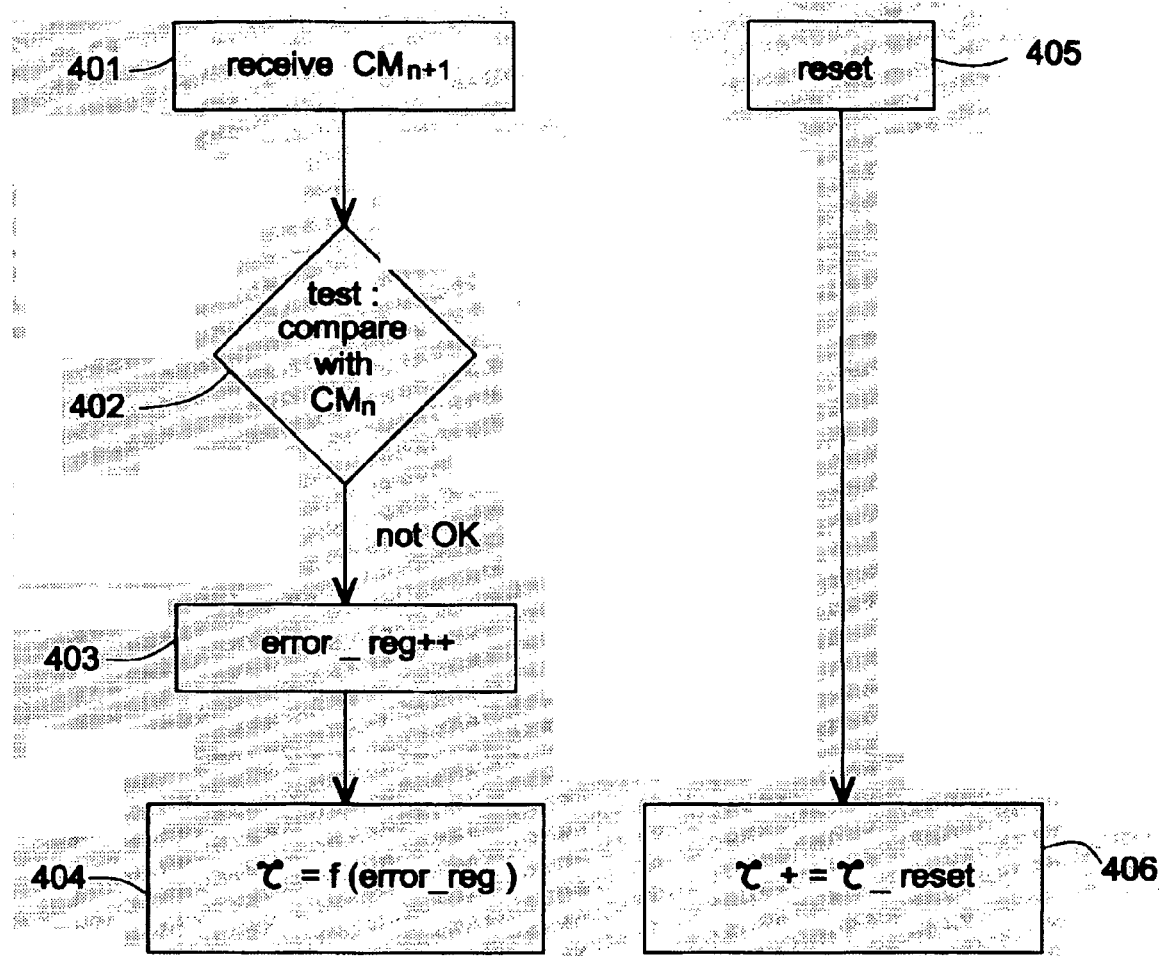
FIG. 4 illustrates an example of an algorithm to be executed by a smartcard according to the present invention.

FIG. 4 illustrates an example of an algorithm to be executed by a smartcard according to the present invention. The smartcard receives a message. The received message may be a command message, e.g. an ECM, an EMM, or any other determined message. When a new command message $CM_{n+1}$ is received (box 401), an analyzing of a sequence of command messages is performed. Typically, the new command message $CM_{n+1}$ is compared to a previous command message $CM_n$ received at an earlier time (box 402). The comparing of the new command message $CM_{n+1}$ to the previous command message $CM_n$ may consists in comparing a determined portion of each command message ($CM_n$, $CM_{n+1}$), e.g. an identifier. The comparing may also consist in comparing an extracted information of each command message ($CM_n$, $CM_{n+1}$), e.g. a control word decrypted by the smartcard.

An error register error_reg may be incremented according to a result of the comparing (box 403). The algorithm further comprises introducing a dead time τ at each processing of the Entitlement Control Messages received at the smartcard (box 404). Such a dead time penalty allows to slow down the smartcard- In the method of the present invention, the dead time τ has a duration that depends on a value of the error register error_reg. Typically, a duration of the dead time τ increases with the value of the error register error_reg.

In a case of a splitter configuration, the smartcard receives more than one ECM per cryptoperiod. The smartcard processes each received ECM so as to allow a descrambling of the scrambled audiovisual information. However, if the analyzing detects a problem at each cryptoperiod, e.g. every 10 seconds, the error register error_reg may have a relatively high value. The dead time τ hence has a relatively high duration, which may prevent the smartcard from processing more than one ECM at each cryptoperiod, thus disrupting a descrambling of a plurality of broadcasted audiovisual programs with a single smartcard.

In a case of a regular paid-up subscriber possessing a regular decoding system, the regular paid-up subscriber may generate, when zapping from a channel to another, a few increments of the error register error_reg. As a consequence, the dead time τ is introduced as a penalty, but the dead time τ has a relatively small duration. Such a short dead time allows the smartcard to process a single regular ECM from a single decoder during a cryptoperiod. The method according to the present invention only disrupts the descrambling with a non-authorized configuration, e.g. the splitter configuration.

The value of the dead time τ may be stored in a RAM memory. If, in the case of the non-authorized configuration, the descrambling is disrupted, an unauthorized user may reset the smartcard, so as to reset the value of the dead time τ and allow an usual descrambling. The algorithm may hence comprise that the value of the dead time τ is incremented by a reset dead time τ_reset (box 406) upon a reset of the smartcard (box 405). The reset dead time τ_reset may have a duration that depends on a number of ECM received at the smartcard following the reset. At a first processing that immediately follows the reset, the duration of the reset dead time τ_reset may be equal to a first reset time value that is relatively high. The unauthorized user that resets the smartcard thus fails to obtain the regular descrambling.

In addition to the slowing down of the smartcard, the applying a penalty may comprise a blocking of the smartcard. As the smartcard analyses previous command messages, it is possible to adapt the penalty from the introduction of a relatively small dead time to the blocking of the card.

Furthermore, a hacker may attack the smartcard with a high number of attack messages so as to extract essential parameters. In prior art, the smartcard fails to provide the analysis of the sequence of command messages. By providing an analysis of the sequence of command messages that are received at previous times, the method of the present invention allows to detect such an attack. The attack messages may indeed be relatively similar and the error register error_reg may have a relatively high value if an adequate analysis is performed. The penalties applied to the smartcard, e.g. the introducing of the dead time τ or the blocking of the smartcard, may slow down or stop the attack.

Analysis of a Sequence of ECMs

Figure 5A:
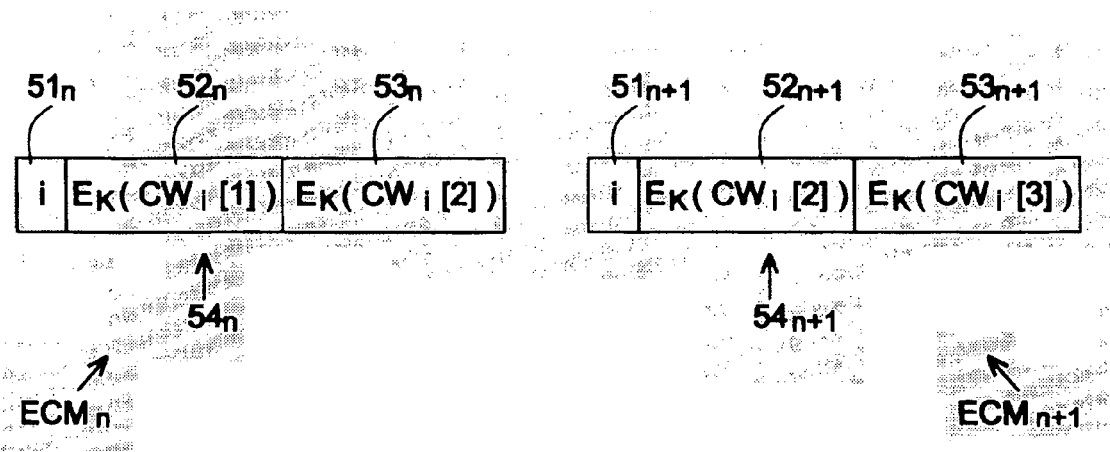
FIG. 5A and FIG. 5B illustrate an example of a sequence of command messages received by a portable security module according to the present invention.
Figure 5B:
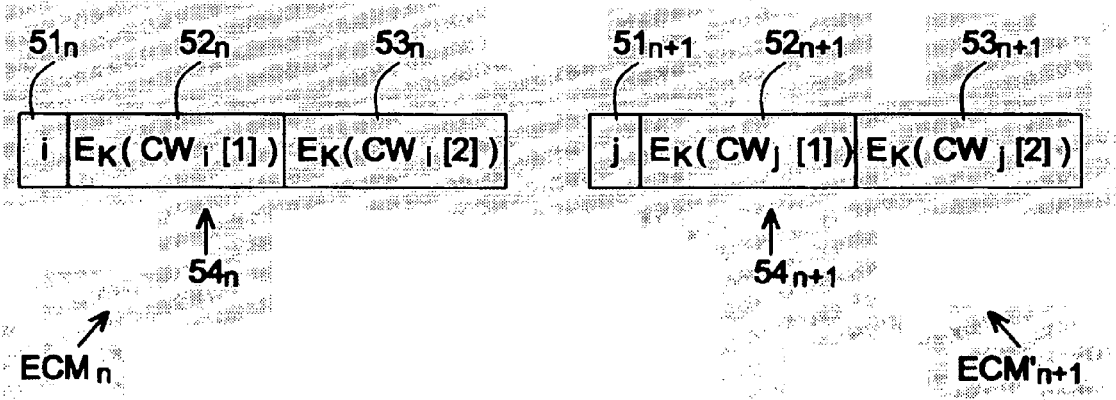

FIG. 5A and FIG. 5B illustrate an example of a sequence of command messages received by a portable security module according to the present invention. The illustrated sequence comprises two successive Entitlement Control Messages. The sequence of command messages of FIG. 5A is received by a portable security module, e.g. a smartcard, being used in a regular configuration. The sequence of command messages of FIG. 5B is received by a smartcard being used in a splitter configuration, or by a smartcard being used in a regular configuration if a regular paid-up subscriber zaps from a determined channel i to a second channel j substantially after the receiving of a previous Entitlement Control Message $ECM_n$.

The Entitlement Control Messages ($54_n$, $54_{n+1}$) of both FIG. 5A and FIG. 5B comprise a first encrypted control word ($52_n$, $52_{n+1}$). The smartcard allows to decrypt the first encrypted control word ($52_n$, $52_{n+1}$). The first Control Word $CW_i[1]$ extracted from the previous Entitlement Control Message $ECM_n$ allows a descrambling of scrambled audiovisual information of the determined channel i during a first cryptoperiod.

In a first embodiment of the present invention, the Entitlement Control Messages ($54_n$, $54_{n+1}$) further comprise a second encrypted control word ($53_n$, $53_{n+1}$). The smartcard allows to decrypt the second encrypted control word ($53_n$, $53_{n+1}$). The second Control Word $CW_i[2]$ extracted from the previous Entitlement Control Message $ECM_n$ allows a descrambling of scrambled audiovisual information of the determined channel i during a second cryptoperiod distinct from the first cryptoperiod. The second cryptoperiod may immediately follow the first cryptoperiod.

In the case of the regular configuration, as illustrated in FIG. 5A, if the regular paid-up subscriber watches only programs of the determined channel, the second Control Word $CW_i[2]$ extracted from the previous Entitlement Control Message $ECM_n$ is similar to a first Control Word $CW_i[2]$ of the new Entitlement Control Message $ECM_{n+1}$.

In the case of a zapping substantially between the receiving of the previous Entitlement Control Message $ECM_n$ and the receiving of a further Entitlement Control Message $ECM'_{n+1}$, as illustrated in FIG. 5B, the smartcard receives as a further Entitlement Control Message an Entitlement Control Message $ECM'_{n+1}$ that is associated to the second channel j that is distinct from the determined channel i. The second Control Word $CW_i[2]$ extracted from the previous Entitlement Control Message $ECM_n$ is hence different from to the first Control Word $CW_j[1]$ of the new Entitlement Control Message $ECM'_{n+1}$.

In the case of a splitter configuration, as illustrated in FIG. 5B, the smartcard receives Entitlement Control Messages from a plurality of decoders, each decoder allowing to descramble a flow of scrambled audiovisual information of a corresponding channel. If for example the splitter allows the smartcard to communicate with two decoders, the two corresponding channels are likely to be distinct as distinct users may not always watch same TV programs.

If the corresponding channels are distinct, the Control Words allowing to descramble scrambled audiovisual information from each corresponding channel are distinct. Therefore the second Control Word $CW_i[2]$ extracted from the previous Entitlement Control Message $ECM_n$ is hence different from to the first Control Word $CW_j[1]$ of the new Entitlement Control Message $ECM'_{n+1}$.

In the first embodiment, an analyzing of the sequence of command messages consists for example in comparing the second Control Word extracted from the previous Entitlement Control Message to the first Control Word of the new Entitlement Control Message. Such analysis may be performed at each receiving of a new Entitlement Control Message, or periodically.

The previous Entitlement Control Message to which the new Entitlement Control Message is compared may be received immediately before the new Entitlement Control Message. Alternatively, in particular in a case of a double streaming, the previous Entitlement Control Message may be chosen according to a predetermined order.

In a second embodiment of the present invention that is also illustrated in FIGS. 5A and 5B, the received Entitlement Control Messages ($54_n$, $54_{n+1}$) comprise a channel identifier ($51_n$, $51_{n+1}$). The channel identifier $51_n$ of the previous Entitlement Control Message $54_n$ is associated to the determined channel that the first control word $CW_i[1]$ allows to descramble.

In the case of the regular configuration, as illustrated in FIG. 5A, if the regular paid-up subscriber does not zap substantially between the receiving of the previous Entitlement Control Message $ECM_n$ and the receiving of a new Entitlement Control Message $ECM_{n+1}$, the scrambled audiovisual information from the determined channel only is descrambled. The channel identifier $51_n$ of the previous Entitlement Control Message $ECM_n$ is hence similar to the channel identifier $51_{n+1}$ of the new Entitlement Control Message $ECM_{n+1}$.

In the case of a zapping substantially between the receiving of the previous Entitlement Control Message $ECM_n$ and the receiving of a further Entitlement Control Message $ECM'_{n+1}$, as illustrated in FIG. 5B, the smartcard receives as a further Entitlement Control Message an Entitlement Control Message $ECM'_{n+1}$ that is associated to the second channel j that is distinct from the determined channel i. The channel identifier $51_n$ of the previous Entitlement Control Message $ECM_n$ is hence different from the channel identifier $51_{n+1}$ of the new Entitlement Control Message $ECM'_{n+1}$.

In the case of a splitter configuration, also illustrated in FIG. 5B, the smartcard probably receives Entitlement Control Messages associated to at least two distinct channels, as explained in an above paragraph. The channel identifier $51_n$ of the previous Entitlement Control Message $ECM_n$ is thus different from the channel identifier $51_{n+1}$ of the new Entitlement Control Message $ECM'_{n+1}$.

In the second embodiment, an analyzing of the sequence of command messages consists for example in comparing the channel identifier of the previous Entitlement Control Message to the channel identifier of the new Entitlement Control Message. Such analysis may be performed at each receiving of a new ECM, or periodically. The previous Entitlement Control Message to which the new Entitlement Control Message is compared may be received immediately before the new Entitlement Control Message.

In a case of a double stream, the second embodiment allows to detect no change of channel identifier in the regular configuration and at least one change of channel identifier in the splitter configuration. In this latter configuration, during a cryptoperiod, the smartcard receives at least:
- a first ECM A associated to a first decoder and to a first stream;
- a second ECM A' associated to the first decoder and to a second stream;
- a third ECM B associated to a second decoder and to the first stream;
- a fourth ECM B' associated to the second decoder and to the second stream.

The first ECM, the second ECM, the third ECM and the fourth ECM may be received in the following order: A, A', B, B'. The analyzing detects at least one change of channel identifier. The analyzing detects at least three changes of channel identifier if the ECM, the second ECM, the third ECM and the fourth ECM are received in the following order: A, B, A', B'.

In the case the double streaming in the regular configuration without zapping, only the first ECM A and the second ECM A' are received and no change of channel identifier is detected. In this latter case, a method according to the first embodiment of the present invention detects a change between the second Control Word of the previous Entitlement Control Message and the first Control Word of the new Entitlement Control Message. It is necessary to take into consideration the double streaming in the analyzing: the previous Entitlement Control Message is chosen according to a predetermined order. The second embodiment allows to avoid such a precaution.

However, if a hacker attacks the smartcard with a high number of attack Entitlement Control Messages that are relatively similar, the method according to the first embodiment allows to detect a high number of changes between the second Control Word of the previous Entitlement Control Message and the first Control Word of the new Entitlement Control Message. The method of the second embodiment may detect no change in the channel identifiers.

As illustrated in FIG. 5A and FIG. 5B, the received Entitlement Control Messages may comprise both the channel identifier ($51_n$, $51_{n+1}$) and the second encrypted Control Word ($53_n$, $53_{n+1}$). The comparing of the first embodiment and the comparing of the second embodiment may both be performed as an analyzing of the sequence of command messages.

The analyzing may be performed on any other messages received at the smartcard, e.g. EMMs or reset messages. The analyzing may consist in comparing a determined content, e.g. a channel identifier, or an extracted information, e.g. a Control Word, of two command messages. If the compared determined contents/extracted information are different, an error register may be incremented. A penalty may be applied depending on a value of the error register. The applying a penalty typically comprises introducing a dead time at each processing of an Entitlement Control Message.

Dead Times Management

Figure 6A:
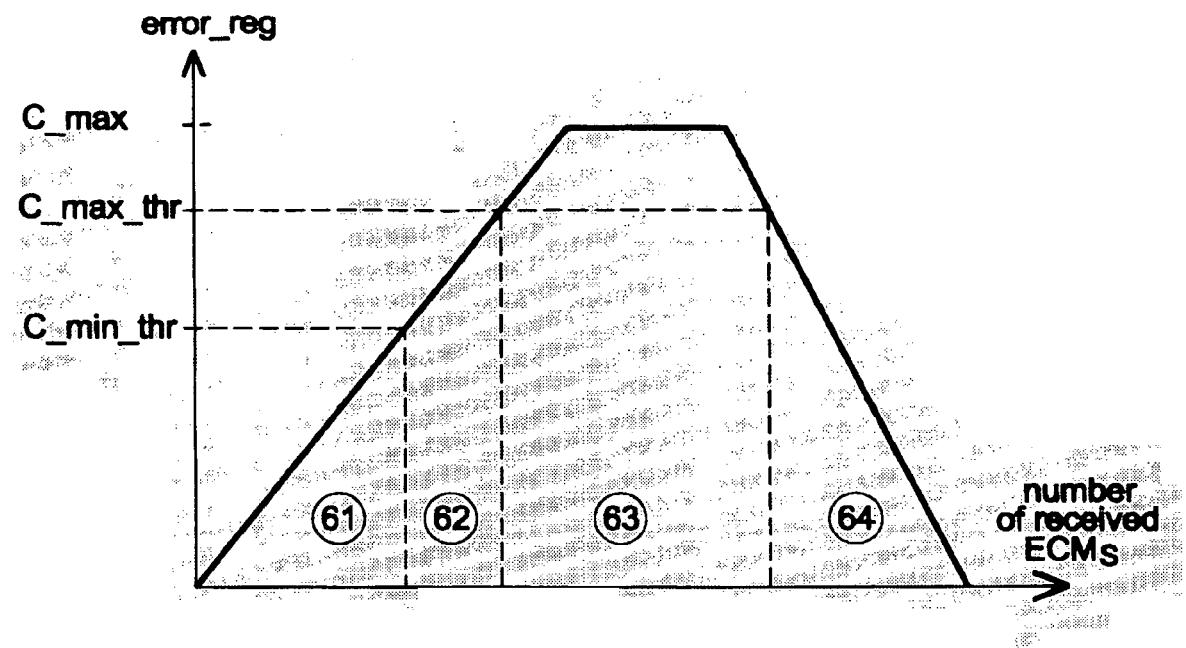
FIG. 6A illustrates a possible sequence of values of an error register in a portable security module according to the present invention.

FIG. 6A illustrates a possible sequence of values of an error register in a portable security module according to the present invention.

Figure 6B:
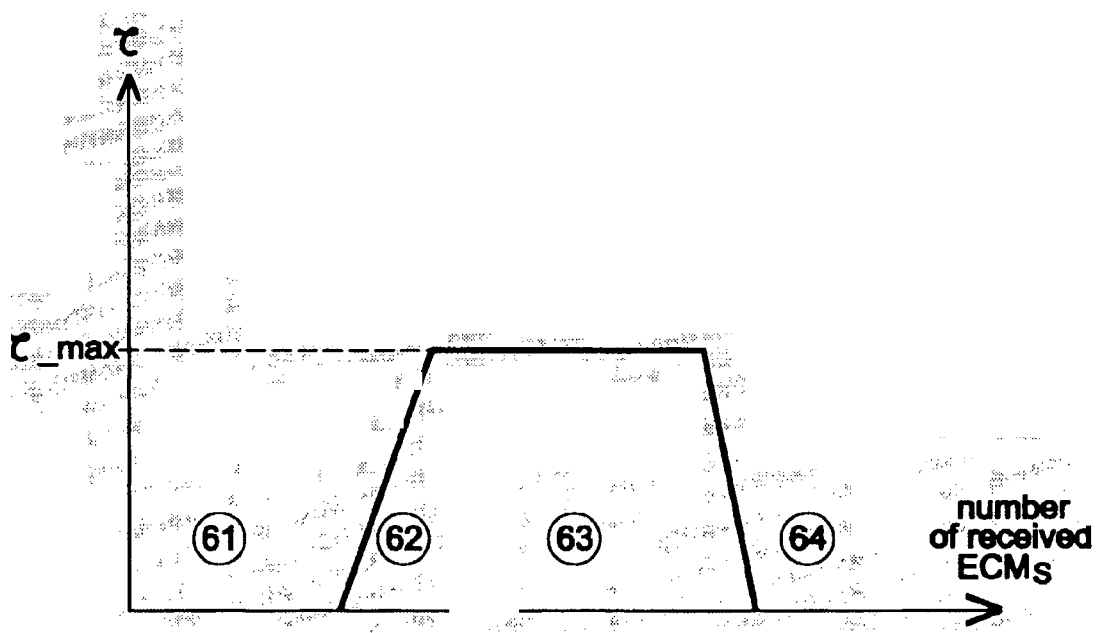
FIG. 6B illustrates a possible sequence of values of a duration of a dead time in a portable security module according to the present invention.

FIG. 6B illustrates a possible sequence of values of a duration of a dead time in a portable security module according to the present invention. The dead time sequence of FIG. 6B corresponds to the error register sequence of FIG. 6A.

Both sequences are plotted as a function of a number of Entitlement Control Messages received after a reset.

The illustrated sequences may be observed in a splitter configuration, or in a high zapping behavior of a regular paid-up subscriber. An analyzing of the received Entitlement Control Messages allows to detect differences in compared determined contents/extracted information of the sequentially received Entitlement Control Messages. During a first phase 61 following the reset, the error register is hence regularly incremented, e.g. at each receiving of one Entitlement Control Message.

In the example illustrated in FIG. 6A and FIG. 6B, the dead time has a duration equal to zero if the value of the error register is smaller than a minimum threshold value C_min_thr, so as to avoid to harm the regular paid-up subscriber that zaps from one channel to an other channel.

During a second phase 62, the value of the error register becomes equal to the minimum threshold C_min_thr; the duration of the dead time is hence non null and increases with the value of the error register. However, the duration of the dead time remains smaller than a maximum time value $\tau\_max$ corresponding to a maximum threshold value C_max_thr of the error register. The maximum time value $\tau\_max$ is high enough to prevent the smartcard from processing more than one Entitlement Control Message during a single cryptoperiod. In a case of a double streaming, wherein a given decoder sends a given number of Entitlement Control Messages at each cryptoperiod, the maximum time value $\tau\_max$ has a value that is high enough to prevent the processing of the given number of Entitlement Control Messages from a plurality of decoders. Typically, the smartcard may process only one given number of Entitlement Control Messages per cryptoperiod.

If the dead time has a duration that is substantially equal to the maximum time value, the smartcard fails to allow the descrambling of a plurality of scrambled audiovisual information from a plurality of decoders. At least one unauthorized user, or a paid-up subscriber that shares its smartcard with the unauthorized user(s), may see a screen turn blank.

A regular paid-up subscriber that zaps a lot from a channel to an other channel may generate an increase of the dead time and may see the screen turn blank during one cryptoperiod after an additional zapping. The regular paid-up subscriber may attribute the blank screen to a broadcast problem and may try to watch another channel, thus increasing the value of the error register. In the example illustrated in FIG. 6A, the value of the error register may always be below a maximum value C_max, so as to avoid over-punishing the smartcard. However, parameters such a the maximum time value $\tau\_max$, the minimum threshold value C_min_thr etc. may be judicially chosen so as to avoid the regular paid-up subscribers to see the screens turn blank.

The error register may go on increasing during a third phase 63 even if the duration of the dead time is equal to the maximum time value $\tau\_max$, particularly in the case of the splitter configuration.

The error register may be based on a circular principle: early increments that are generated by old Entitlement Control Messages are erased. For example, a circular register having a determined size may be used to evaluate the error register. Each time the analyzing is performed, binary values of the circular register are left shifted. The binary value at a former location at a left end of the circular register is hence erased. A new binary value that depends on a result of the analyzing is written at a now empty location at a right end of the circular register. Typically, a '1' may be written if a difference between compared determined contents/extracted information of the analyzed Entitlement Control Messages is detected, and a '0' may be written if not.

The error register may have a value that equals a sum of the binary values of the circular register. The value of the error register is hence always smaller or equal to a maximum that corresponds to the size of the circular register: if equal, all the locations of the circular register are filled with '1'. The maximum may be the maximum value C_max represented in FIG. 6A.

The value of the error register may also decrease if differences between the compared determined contents/extracted information of the analyzed Entitlement Control Messages are no longer detected, as represented in FIG. 6A. The decreasing may be due to various reasons. In the case of a splitter configuration, the unauthorized users may turn their decoders off. The regular paid-up subscriber may no longer zap etc.

Alternatively, the error register may be a single integer that is incremented or decremented depending on a result of the analyzing of the sequence of command messages.

As long as the value of the error register is higher than a decrease threshold, e.g. the maximum threshold value C_max_thr, the duration of the dead time remains equal to the maximum time value $\tau\_max$.

When, at a fourth phase 64, the value of error register becomes smaller than the maximum threshold value C_max_thr, the duration of the dead time begins decreasing.

In the case of the splitter configuration, if the unauthorized user keeps his decoder on at the third phase 63, the duration of the dead time remains at the maximum time value $\tau\_max$. If the unauthorized user turns his decoder on at the fourth phase 64, the error register starts to increase again (not represented sequence).

The unauthorized user may also reset the smartcard at the third phase so as to reset the value of the duration of the dead time. The value of the duration of the dead time and the value of the error register may indeed be stored in a volatile memory that is erased upon a reset.

Figure 6C:
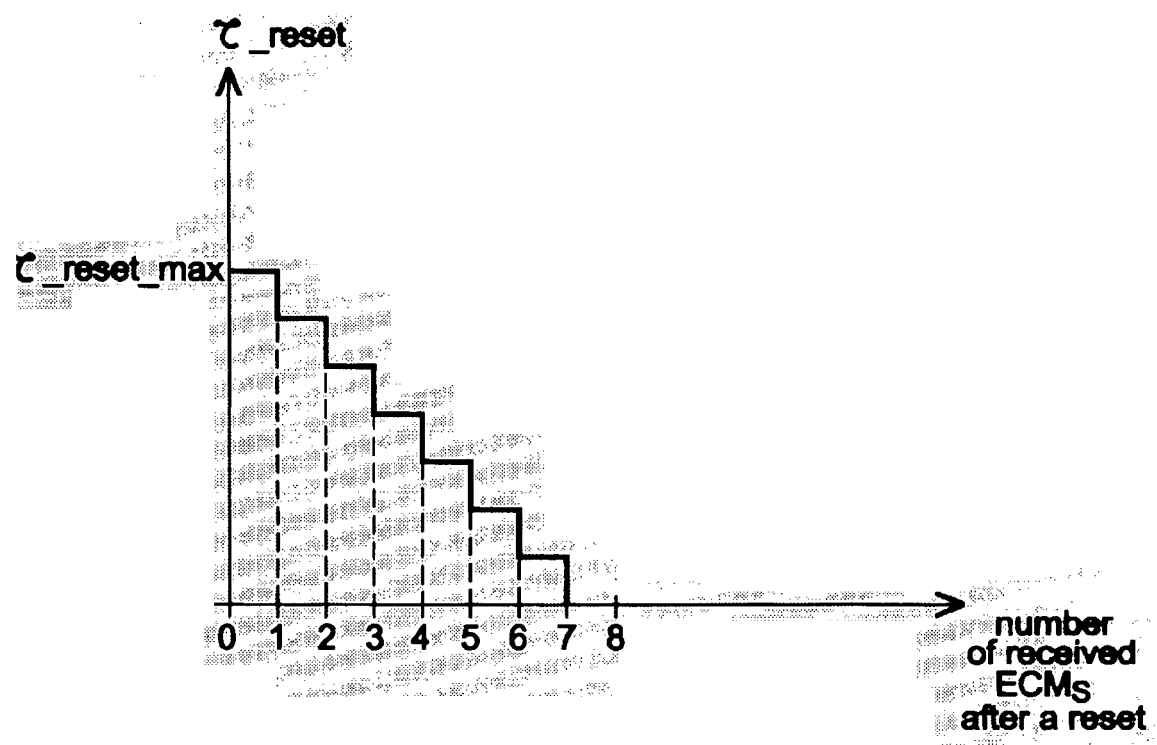
FIG. 6C illustrates an example of a sequence of values of a duration of a dead time of a portable security module according to the present invention.

FIG. 6C illustrates an example of a sequence of values of a duration of a dead time of a portable security module according to the present invention. The sequence is plotted as a function of a number of Entitlement Control Messages received after a reset. Unlike the example sequence illustrated in FIG. 6B, the example sequence of FIG. 6C has a non-null value immediately after the reset A reset dead time may be introduced at each processing of one Entitlement Control Message after the reset. The reset dead time has a duration that depends on a number of Entitlement Control Messages received at the smartcard after the reset. The duration of the reset dead time is equal to a first reset time value $\tau\_reset\_max$ at a first processing that immediately follows the reset and decreases with the number of received Entitlement Control Messages.

The introducing of the reset dead time and the introducing of the dead time may be implemented in a single software program: a total dead time may be equal to a sum of the reset dead time that may be read in an EEPROM and of the dead time that is evaluated from a circular register stored in a volatile memory.

The smartcard processing is hence slowed down by the reset dead time upon a reset.

The first reset time value $\tau\_reset\_max$ is preferably smaller than a maximum time value $\tau\_max$ of the dead time, so as to avoid harming a regular paid-up subscriber after a regular reset, e.g. a reset due to a power cut.

As the first reset time value $\tau\_reset\_max$ is smaller than the maximum time value $\tau\_max$, an unauthorized user may try to reset the smartcard every time the descrambling of the scrambled audiovisual information fails to function correctly. A hacker may even generate a reset of the smartcard at each cryptoperiod or so, in order to allow a correct descrambling or for an attack purpose.

Smartcard Blocking

Figure 7:
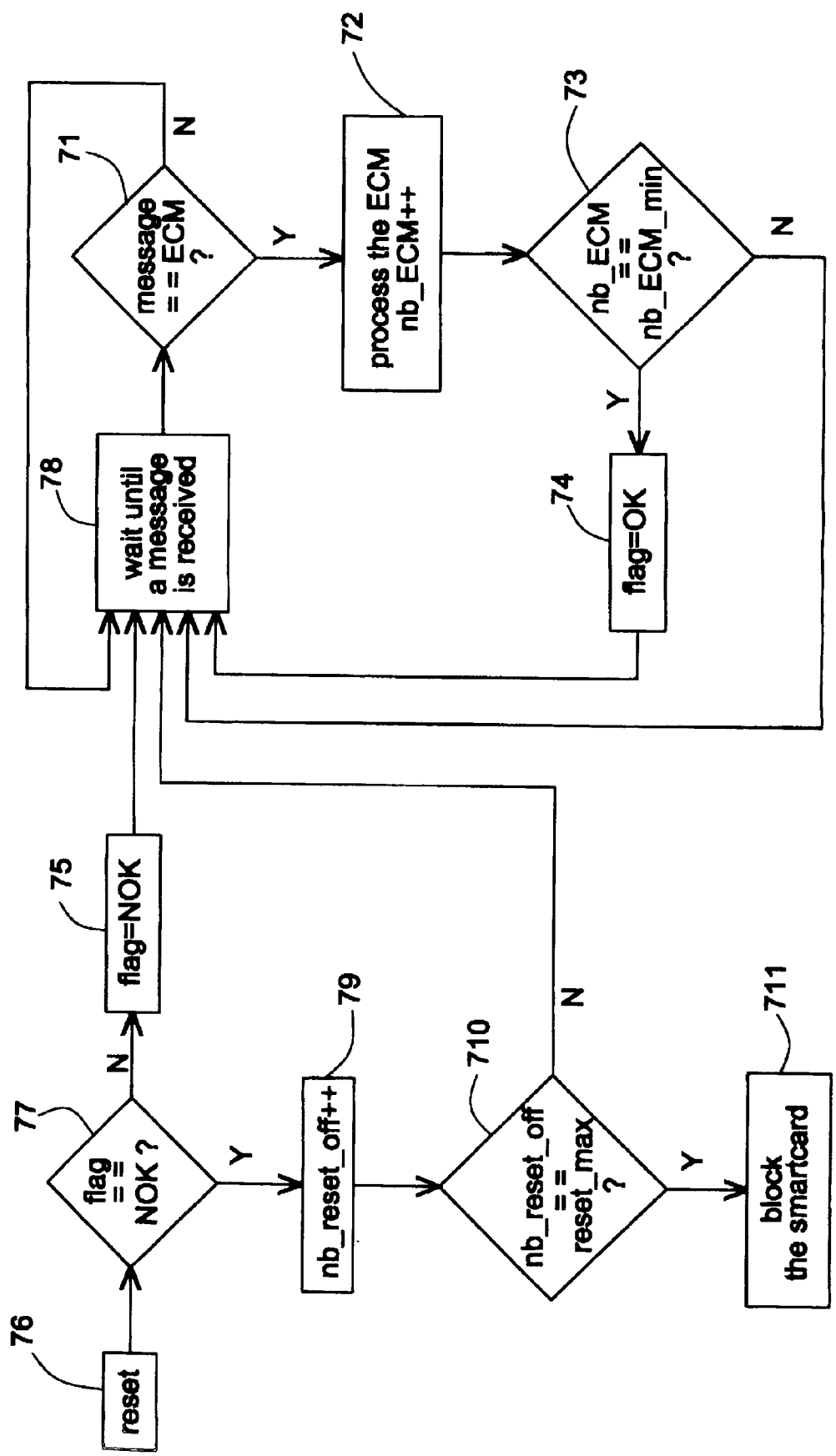
FIG. 7 illustrates an example of an algorithm to be implemented in a portable security module according to the present invention.

FIG. 7 illustrates an example of an algorithm to be implemented in a portable security module according to the present invention. The algorithm of FIG. 7 allows to evaluate a nature of a further reset according to an intermediate group of intermediate command messages. The intermediate group comprises a sequence of command messages, e.g. Entitlement Control Messages, received after a previous reset preceding the further reset.

When a message is received at the smartcard, the smartcard tests whether the message is an ECM or not (box 71). If the message is an ECM, the smartcard processes the Entitlement Control Message, e.g. the smartcard decrypts an encrypted control word comprised within the Entitlement Control Message. A number of intermediate command messages is counted by incrementing a count register nb_ECM after each processing (box 72).

The number of intermediate command messages is compared to a reset threshold number nb_ECM_min (box 73). A result of the comparing allows to evaluate the nature of the further reset: if the count register nb_ECM equals the reset threshold number nb_ECM_min, a flag that has a NOK value, e.g. '0', after each reset (box 75) is set to an OK value, e.g. '1' (box 74).

If the count register nb_ECM is higher than the reset threshold number nb_ECM_min, the flag already has an OK value. If the count register nb_ECM is smaller than the reset threshold number nb_ECM_min, the flag has a NOK value. The value of the flag hence indicates whether the number of intermediate command messages is higher than the reset threshold number nb_ECM_min or not. The value of the flag is stored in a non-volatile memory. When the further reset occurs (box 76), the value of the flag is read and is compared to the NOK value (box 77).

If the value of the flag is OK, i.e. if the smartcard has received more than the reset threshold number nb_ECM_min of Entitlement Control Messages since the previous reset, the further reset is evaluated as regular. The flag is reset to the NOK value again (box 75) and the smartcard waits for a new message (box 78). Each new ECM is processed (box 72) and the flag keeps the NOK value until a reset threshold number nb_ECM_min of Entitlement Control Messages is received and processed, as described in a previous paragraph.

If the value of the flag is NOK, i.e. the number of intermediate command messages is smaller than the reset threshold number nb_ECM_min since the previous reset, the further reset is evaluated as suspicious. A reset error register nb_reset_off is incremented (box 79) and its value is compared to a reset errors threshold reset_max (box 710).

If the value of the reset error register nb_reset_off equals the reset errors threshold reset_max, the smartcard is blocked (box 711). If the value of the reset error register nb_reset_off is smaller than the reset errors threshold reset_max, the smartcard waits for a message (box 78) and further counts intermediate command messages. The value of the reset error register nb_reset_off may not be higher than the reset errors threshold reset_max, since the smartcard is blocked when the value of the reset error register nb_reset_off equals the reset errors threshold reset_max.

Such algorithm allows to penalize an unauthorized user that resets the smartcard each time the scrambled audiovisual information is incorrectly descrambled, or that automatically resets the smartcard after a small number of cryptoperiods.

The algorithm also allows to block a smartcard that receives attacks commands with a reset between them.

Parameters such as the reset errors threshold reset_max, the reset threshold number nb_ECM_min etc. may have adequate values that are adapted to possible behaviors of a regular paid-up subscriber, of an unauthorized user and of a hacker.

Any other algorithm for managing penalties may be applied on the smartcard: for example, the smartcard may be blocked when the value of the error register reaches a limit value, the limit value being higher than the maximum threshold value C_max_thr.

The analyzing of the sequence of command messages may preferably consist in comparing a new Entitlement Control Message to a previous Entitlement Control Message. Alternatively, EMMs, reset messages, or any other message received at the smartcard may be analyzed. The analyzing of the sequence of command messages may also consists in counting a number of intermediate command messages between two resets so as to evaluate a nature of a previous reset.

The analyzing may preferably be a combination of the described above analyses: for example, each new Entitlement Control Message is compared to a previous Entitlement Control Message and a number of Entitlement Control Messages between two resets is counted, so as to reinforce a securing of the smartcard. An other example of a combination of the described above analyses consists in comparing each new ECM to a previous ECM, each new EMM to a previous EMM, and each new other command message to a previous other command message. Both the ECMs, the EMMs and the other command messages may be counted to evaluate resets. Preferably three distinct counting means are implemented, so as to provide a complete understanding of a behavior of a user and hence apply an adequate penalty.

Preferably the penalty that is applied on the smartcard allows to disrupt the processing of the ECMs. The penalty may also allow to disrupt an EMM processing, a receiving of messages at the smartcard, or any other action of the smartcard.

A software that allows to implement the method according to the present invention is also comprised within the scope of the present invention.

The software may be downloaded at a manufacturing of the portable security module. Alternatively, at least one configuration message is received at the portable security module when already in use by a subscriber, thus allowing to download the software. Both methods are comprised within the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for securing a portable security module for use with a decoding element, the portable security module and the decoding element allowing to descramble scrambled audiovisual information, the method comprising:
   processing at the portable security module Entitlement Control Messages (ECMs) received at the portable security module to allow the descrambling of the scrambled audiovisual information;
   analyzing at the portable security module a sequence of ECMs, the sequence of ECMs comprising a new ECM and a previous ECM received at a previous time, the ECMs of the sequence being received at the portable security module at distinct times, the analyzing being performed at the receiving of the new ECM;
   incrementing an error register upon a determined result of the analyzing, wherein the error register is incremented when the previous ECM and the new ECM do not match;
   applying a penalty to the portable security module depending on a value of the error register by introducing a dead time at the processing so as to slow down the processing.

2. The method according to claim 1, wherein the ECMs are replaced with Entitlement Management Messages (EMMs).

3. The method according to claim 1, wherein: the dead time has a duration that depends on a value of the error register.

4. The method according to claim 1, wherein
the duration of the dead time is shorter than a maximum time value;
the maximum time value is high enough to prevent the portable security module from processing more than one ECM during a single cryptoperiod.

5. The method according to claim 1, wherein:
each ECM ($54_{no}$ $54_{n+1}$) comprises a channel identifier ($51_{no}$ $51_{n+1}$), the channel identifier being associated to a determined channel;
the analyzing of the sequence of ECMs comprises comparing the channel identifier $51_{n+1}$ of the new ECM $54_{n+1}$ and the channel identifier $51_n$ of the previous ECM $54_n$.

6. The method according to claim 1, wherein:
each ECM ($54_{no}$ $54_{n+1}$) comprises a first encrypted Control Word ($52_{no}$ $52_{n+1}$) and a second encrypted Control Word ($53_{no}$ $53_{n+1}$);
the first Control Word allows to descramble the scrambled audiovisual information during a first cryptoperiod;
the second Control Word allows to descramble the scrambled audiovisual information during a second cryptoperiod distinct from the first cryptoperiod;
the analyzing of the sequence of ECMs comprises comparing a second Control Word $53_n$ of the previous ECM $54_n$ to a first Control Word $52_n$ of the new ECM $54_{n+1}$.

7. The method according to claim 1, wherein:
the analyzing of the sequence of ECMs comprises comparing a determined content of a first ECM of the sequence of ECMs to a second determined content of a second ECM of the sequence of ECMs.

8. The method according to claim 1, further comprising:
introducing upon a reset a reset dead time at each processing of the ECMs, wherein:
the reset dead time has a duration that depends on a number of ECMs received at the portable security module after the reset, the duration being equal to a first reset time value at a first processing immediately following the reset; the first reset time value is smaller than the maximum time value.

9. The method according to claim 1, further comprising:
evaluating the nature of a further reset according to an intermediate group of intermediate ECMs, the intermediate group comprising the ECMs received after a previous reset preceding the further reset.

10. The method according to claim 9, further comprising:
counting the number of the intermediate ECMs;
comparing the number of the intermediate ECMs to a reset threshold number, wherein a result of the comparing allows to evaluate the nature of the further reset;
incrementing upon the further reset a reset error register if the further reset is evaluated as suspicious; or;
blocking the portable security module if the reset error register has a value that is higher than a reset errors threshold.

11. A portable security module for use with a decoding element, wherein the portable security module and the decoding element allow to descramble scrambled audiovisual information, the portable security module comprising:
receiving means to receive Entitlement Control Messages (ECMs);
processing means to process an ECM received at the portable security module so as to allow the descrambling of the scrambled audiovisual information;
the portable security module being characterized in that it further comprises:
a command message memory into which a previous ECM ($ECM_n$) received at a previous time may be stored;
analyzing means to analyze a sequence of ECMs, the sequence of ECMs comprising a new ECM and the previous ECM, the ECMs of the sequence being received at the portable security module at distinct times, and the analyzing being performed at each receiving of a new ECM ($ECM_{n+1}$);
comparing means to compare the new ECM and the previous ECM of the sequence of ECMs;
an error register;
incrementing means to increment the error register depending on a result of the comparing, wherein the error register is incremented when the previous ECM and the new ECM do not match;
delaying means to introduce a dead time at each processing so as to slow down the processing.

12. The portable security module according to claim 11, wherein:
the delaying means also allow upon a reset to introduce a reset dead time at each processing following the reset;
the reset dead time has a duration that depends on a number of processing following the reset, the duration being equal to a first reset time value at a first processing immediately following the reset.

13. The portable security module according to claim 11, further comprising:
a count register allowing to store a number of intermediate ECMs, the intermediate ECMs being received at the portable security module after a previous reset;
a flag, the flag having a value that depends on a result of a comparing of the count register to a reset threshold number;
a reset error register that is incremented depending on the value of the flag upon a further reset;
blocking means to block the portable security module according to a value of the reset error register.

14. The portable security module according to claim 11, wherein the ECMs are replaced by Entitlement Management Messages (EMMs).

15. A computer program for use within a portable security module, wherein the computer program implements the method according to claim 1.

16. A method for securing a portable security module comprising downloading a software that allows to implement a method according to claim 1, wherein the downloading comprises receiving at the portable security module at least one configuration message from the decoding element.

17. The method according to claim 3, wherein the duration of the dead time is shorter than a maximum time value; the maximum time value is high enough to prevent the portable security module from processing more than one ECM during a single cryptoperiod.

18. The method according to claim 3, wherein:
each ECM ($54_{no}$ $54_{n+1}$) comprises a channel identifier ($51_{no}$ $51_{n+1}$), the channel identifier being associated to a determined channel;
the analyzing of the sequence of ECMs comprises comparing the channel identifier $51_{n+1}$ of the new ECM $54_{n+1}$ and the channel identifier $51_n$ of the previous ECM $54_n$.

19. The method according to claim 4, wherein:
each ECM ($54_{no}$ $54_{n+1}$) comprises a channel identifier ($51_{no}$ $51_{n+1}$), the channel identifier being associated to a determined channel;

the analyzing of the sequence of ECMs comprises comparing the channel identifier $51_{n+1}$ of the new ECM $54_{n+1}$ and the channel identifier $51_n$ of the previous ECM $54_n$.

20. The method according to claim 3, wherein:

each ECM ($54_{no}$ $54_{n+1}$) comprises a first encrypted Control Word ($52_{no}$ $52_{n+1}$) and a second encrypted Control Word ($53_{no}$ $53_{n+1}$);

the first Control Word allows to descramble the scrambled audiovisual information during a first cryptoperiod;

the second Control Word allows to descramble the scrambled audiovisual information during a second cryptoperiod distinct from the first cryptoperiod;

the analyzing of the sequence of ECMs comprises comparing a second Control Word $53_n$ of the previous ECMs $54_n$ to a first Control Word $52_n$ of the new ECMs $54_{n+}$.

* * * * *